United States Patent [19]
Hutton

[11] Patent Number: 5,709,247
[45] Date of Patent: Jan. 20, 1998

[54] MULTIPLE VALVE MANIFOLD FOR USE WITH A PRESSURE PROCESSING APPARATUS

[76] Inventor: Peter B. Hutton, c/o Century Valve & Machine Ltd., 1915-30th Ave. N.E., Calgary, Alberta, Canada, T2E 6Z5

[21] Appl. No.: 610,756

[22] Filed: Mar. 4, 1996

[51] Int. Cl.$^6$ .................................................. F16K 11/20
[52] U.S. Cl. ........................................... 137/884; 137/597
[58] Field of Search .................................... 137/597, 884

[56] References Cited

U.S. PATENT DOCUMENTS

| | | | |
|---|---|---|---|
| 465,091 | 12/1891 | Boes | 137/597 |
| 1,462,857 | 7/1923 | Hiller | 137/597 |
| 1,797,591 | 3/1931 | Spartakoff | 137/597 |
| 2,331,133 | 10/1943 | Nardone | 137/597 |
| 2,871,881 | 2/1959 | Hewson | 137/597 |
| 3,596,680 | 8/1971 | Adams | 137/637 |
| 3,744,376 | 7/1973 | Carpenter | 91/414 |
| 3,756,274 | 9/1973 | Wolfgramm | 137/561 R |
| 4,304,257 | 12/1981 | Webster | 137/559 |
| 4,319,492 | 3/1982 | Hewson et al. | 137/883 |
| 4,466,290 | 8/1984 | Frick | 73/756 |
| 4,711,268 | 12/1987 | Coleman | 137/597 |
| 5,267,585 | 12/1993 | Jones | 137/240 |

FOREIGN PATENT DOCUMENTS

| | | |
|---|---|---|
| 2238364 | 5/1991 | United Kingdom. |
| WO 94/20777 | 9/1994 | WIPO. |

OTHER PUBLICATIONS

Catalog 3000, Anderson, Greenwood & Co. Oct. 1980.
Rosemount Model 3051C Smart Pressure Transmitter Family Brochure by Rosemount Inc.
Astava Brochure Mar. 1992 Instrument Valves and Manifolds, pages titled Document B and Document C.
Parker Fluid Connectors, a brochure by Parker Hannifin plc, page titled Variflange Manifold.

*Primary Examiner*—John Fox
*Attorney, Agent, or Firm*—Watson Cole Stevens Davis, PLLC

[57] ABSTRACT

A valve manifold for use with a pressure sensing apparatus such as a differential pressure transmitter, the manifold being characterized by a simplified passageway system internally of the manifold and by reduced size relative to prior art manifolds, the manifold having valve chambers defining valve seats, each of the valve seats being located within a referenced prison defined by mounting holes having axes which are generally perpendicular to first and second, parallel faces of the manifold.

35 Claims, 10 Drawing Sheets

MULTIPLE VALVE MANIFOLD FOR USE WITH A PRESSURE PROCESSING APPARATUS

BACKGROUND OF THE INVENTION

The present invention relates to valve manifolds used with pressure sensing devices, particularly with a pressure transmitter.

Pressure transmitters serve the purpose of monitoring variables of a process fluid flow in a pipeline. A pressure transmitter has a first and a second process fluid inlet. In operation, each of the two inlets communicates, with a separate point in a process fluid pipeline. The pressure transmitter typically transmits pressure values or differentials at the two points. The transmitted values are then used in extrapolating various conditions prevailing in the pipeline. One example of an operative arrangement of a pressure transmitter is shown in U.S. Pat. No. 4,466,290 (Frick) issued Aug. 21, 1984 and in other prior art referred to hereafter.

In pipeline systems, there is often a limited space around a pressure transmitter. Different spacing between the centers of process fluid source outlets at the pressure transmitter has to be accommodated with a minimum points of potential leaks. For this reason, pressure transmitters have lately been mounted directly on a valve manifold. Valve manifolds of this type are solid blocks provided with a number, usually three or five, valves. The valves control the passage through the block from a process or cleaning fluid source to the transmitter and/or to a vent discharge. The block is interposed between the pressure transmitter and the process fluid source.

The limited space available around a pressure transmitter resulted in attempts to reduce the size of the manifold such that the manifold and the valves mounted in the manifold require as little space as possible while allowing safe and convenient manual operation of the valves in manipulating the flow of process or cleaning fluid through the manifold.

Our U.S. Pat. No. 5,277,224, issued Jan. 11, 1994 (Hutton et al.) which is incorporated herein by reference, presents an example of a manifold where the space required for the operation of the manifold is reduced. However, viewed from the standpoint of the present invention, there is still a part of the manifold which projects sidewise beyond the a periphery defined by mounting holes which typically are adapted to register with mounting holes or bolts of an associated pressure transmitter.

Examples of further prior art references showing the state of the art include, for instance, U.S. Pat. No. 3,596,680 (Adams), issued Aug. 3, 1971; U.S. Pat. No. 3,756,274 (Wolfgramm), issued Sep. 4, 1973. U.S. Pat. No. 1,797,591 (Sartakoff) issued Mar. 24, 1931 and other references.

SUMMARY OF THE INVENTION

It is an object of the present invention to further advance the art of manifolds for the purpose described and to provide a manifold which would allow safe operation of a multiple valve manifold, where the space required for operation of the valves is further reduced and where the overall arrangement of passageways within the manifold block is simplified to reduce production costs.

In general terms and referring to one aspect of the present invention, a valve manifold is provided for use with a pressure sensing apparatus. The manifold comprises an integral body including a parallel and generally planar first and second face section; and a peripheral section extending between the first and second face sections. There is provided a process fluid inlet port means in said second face section and a process fluid outlet port means in said first face section. The latter is complementary with process inlet ports of an associated pressure sensing apparatus.

A plurality of apparatus mounting holes are disposed about the periphery of the first face section. The mounting holes are compatible with bolts for fixedly securing the associated pressure sensing apparatus to said first face section of the manifold. The axes of said mounting holes are generally perpendicular to the first face section.

There are at least three valve mounting bores each machined in said peripheral section. As is known, each valve mounting bore includes a threaded outer portion at the peripheral section of the block, and a coaxial, generally cylindric valve chamber. Each valve chamber terminates at its end remote from the threaded outer portion by a valve seat. The valve seat forms an end of a first associated passageway disposed inside the body or block.

Each valve chamber further communicates, via a communication port in a side wall of the chamber, with a second associated passage disposed inside the body or block.

In accordance with one aspect of the invention, the seats of all the valves of said plurality of valves are located within the reference prism defined by the axes of the mounting holes. This feature provides the advantage of a substantial reduction of the space required for actuation stems of the valves at the side of the manifold block.

Another feature of the present invention is utilized when the manifold is of the type including vent outlet or outlets for the purpose of cleaning or flushing the passageways. In such arrangement, the process fluid inlet ports and vent outlet port or ports are both in the second face of the block. This provides the advantage that no space is required to the side of the block for any conduit connections as all ports required for the function of the manifold are disposed generally perpendicularly to the faces of the manifold block.

In most practical applications, there are two process fluid inlet ports and two vent ports where the flushing fluid leaves the system. Preferably, these ports are arranged in the second face such that the pair of the process ports is disposed on a line parallel with and spaced from another line on which the two vent ports are located. Another advantageous arrangement of the two pairs of ports is in that the pairs of process and vent ports are on axes which cross each other generally at the center of the second face of the manifold block.

The invention will be described by way of two preferred exemplary embodiments, with reference to the accompanying simplified, diagrammatic, not-to-scale drawings. The drawings show.

DETAILED DESCRIPTION OF PREFERRED EMBODIMENTS

Referring firstly to the embodiment shown in FIGS. 1–11. The manifold has a body of the type of a solid block 120 made—in the embodiment shown—from stainless steel, it being understood that the choice of material is optional and depends on a particular application. The block has the shape of a rectangular prism and includes opposed top and bottom walls or first and second face sections 121, 122, a first side wall 123, a second side wall 124 a front wall 125 and a rear wall 126. The walls 123–126 enclose the periphery of the block 120 and are generally referred to as "a peripheral section."

Machined in the second face section 122 is a process fluid first inlet port 127 and a process fluid second inlet port 128. The first inlet 127 communicates, via an upwardly and inwardly inclined first process passage 129 (FIG. 10) with a short horizontal branch 130 which defines a coaxial, inwards directed extension of a first block valve chamber 131 co-axial with a threaded first block valve opening 132. The threaded opening 132 in effect forms a threaded outer portion of a block valve mounting bore comprised of the valve chamber 131 and the opening 132. Each valve chamber of the block defines a valve seat as will be described.

The remaining valve mounting bores described throughout this specification have the same functional arrangement.

The second inlet port 128 likewise communicates, via an upwardly and inwardly inclined second process passage 133 with a short horizontal branch 134 which defines a coaxial, inwards directed extension of a valve chamber 135 co-axial with a second block valve bore opening 136.

The transition between the horizontal branch 130 at its inlet into the valve chamber 131 defines a valve seat co-operating with a valve member (not shown) for selectively blocking the entrance of pressurized process fluid into the valve chamber 131. Similarly, the transition between the branch 134 at its inlet into the valve chamber 135 defines a valve seat co-operating with a valve member (not shown) for selectively blocking the entrance of second pressurized process fluid into the valve chamber 135.

The valve chamber 131 permanently communicates through a short first radial conduit 137 with a first instrument cavity 138. Similarly, the valve chamber 135 communicates via a short second radial conduit 139 with a second instrument cavity 140.

Figure 10:
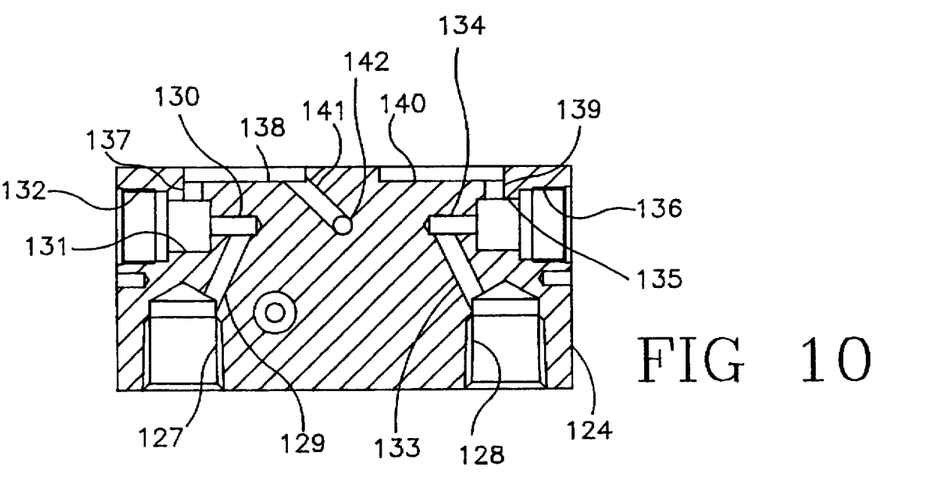
FIG. 10 section X—X of FIG. 5.

The cavity 138 is also in permanent communication with an inlet of an oblique conduit 141 which slopes in the direction from the top wall toward the bottom wall 122 and obliquely toward the second side wall 124, as best seen from FIG. 10. The outlet of the conduit 141, in turn, permanently communicates with a coaxial extension conduit 142 of the equalizer valve chamber 143 which, in turn, is coaxial with the threaded outer part 144 of the equalizer valve bore. The cavity 140 permanently communicates, through a vertical conduit 150 and an oblique conduit 145, with the equalizer valve chamber 143.

The general structure of the equalizer valve chamber 143 is similar to what has been described above. That is to say, the transition between the valve chamber 143 and the extension conduit 142 defines a valve seat for a valve member of a valve (not shown) normally threadably secured at the bore 144. It will be thus appreciated that with the equalizer valve open, the valve chamber 143 FIG. 6 and the extension conduit 142, and thus the two cavities 138, 140, are in a fluid communication to equalize the pressure in the cavities 138, 140.

The cavity 138 further communicates, through an oblique conduit 146 which slopes from the top wall 121 to the bottom wall 122 and obliquely in the direction toward the rear wall 126 (FIG. 8), with an extension conduit 147 coaxial with a cylindric first vent valve chamber 148 which, in turn, is coaxial with a threaded valve bore 149 of a first vent valve.

Figure 7:
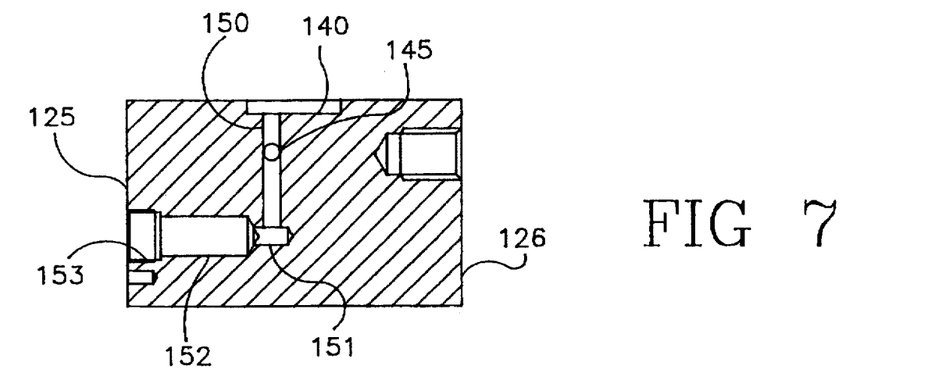
FIG. 7 section VII—VII of FIG. 4.
Figure 8:
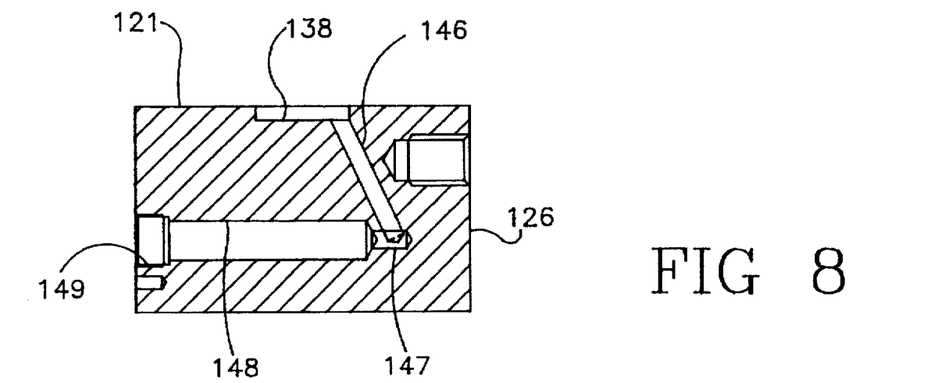
FIG. 8 section VIII—VIII of FIG. 4.
Figure 9:
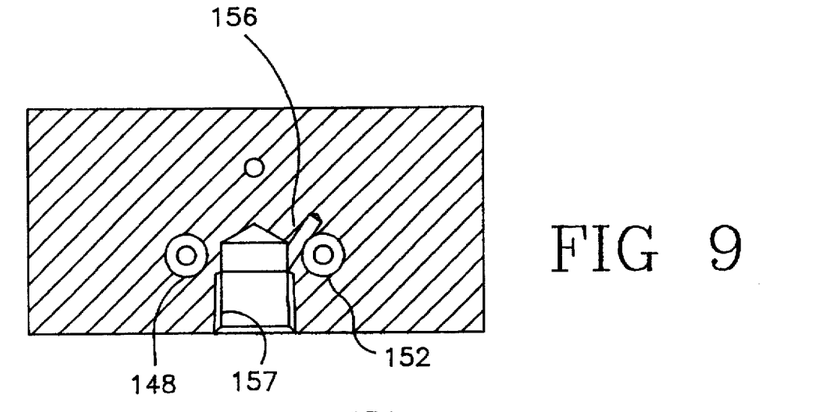
FIG. 9 section IX—IX of FIG. 5.

As mentioned above, the conduit 150 connects the cavity 140 with the oblique conduit 145 and thus with the equalizer valve chamber 143. FIG. 7 shows that the lower portion of the vertical conduit 150 also connects the cavity 140 with a short extension conduit 151 forming a coaxial extension of a cylindric second vent valve chamber 152 which, in turn, is coaxial with a threaded part 153 of the valve mounting bore 153–152 of a second vent valve.

Despite certain structural differences to be discussed later, The vent valve chambers 148 and 152 and their extension conduits 147, 151 are arranged similar to the remaining valve chambers in that there is a valve seat at the inlet of each extension conduit 147, 151 into its associated valve chamber 148, 152. The seat is compatible with a closing member the structure of which will be described later.

Figure 11:
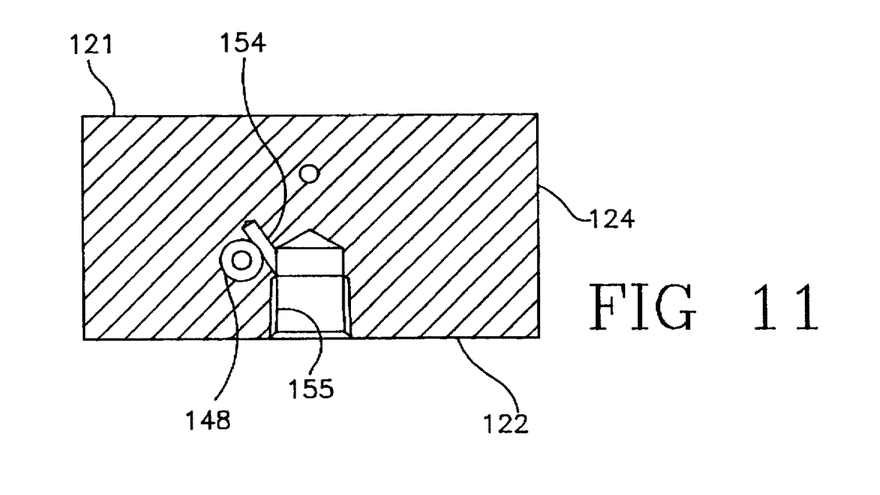
FIG. 11 section XI—XI of FIG. 5.
Figure 12:
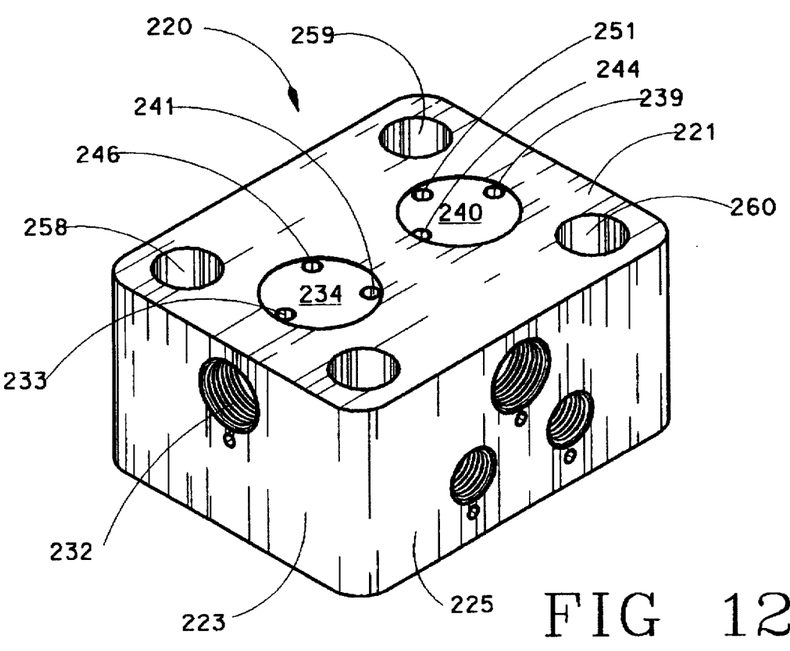
FIG. 12 a top and front perspective view showing a second embodiment of the manifold block including the invention.
Figure 13:
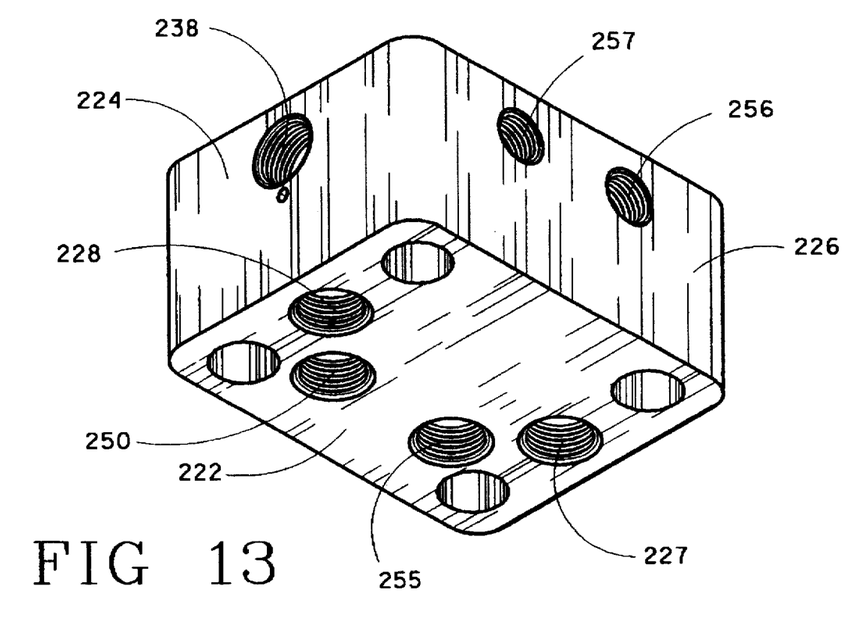
FIG. 13 a bottom and rear perspective view of the manifold block of FIG. 12.

The end of the first vent valve chamber 148 remote from the associated first valve threaded bore 149 communicates with an inlet port of a transverse conduit 154 FIG. 11. As best seen from FIG. 5, the inlet port of the conduit 154 is located in the side wall of the valve chamber 148, near the valve seat of the chamber 148. The downstream end of the transverse conduit 154 is in a permanent communication with a first vent outlet 155 (FIG. 11). The end of the shorter, second vent valve chamber 152 near its valve seat is similarly in a permanent communication with an inlet port (FIG. 9) of a second transverse conduit 156 and through it with a second vent outlet 157.

The vent outlets 155, 157 are adapted to become connected to a suitable discharge conduits exterior to the body of the manifold and not forming a part of the invention.

There are two threaded bores 158, 159 in the rear wall 126. They serve the purpose of securing the body 120 to a bracket. Furthermore, four mounting holes 160–163 are provided for bolts securing a complementary pressure transmitter to the top face 121 of the body 120, in a sealing engagement with the cavities 138, 140.

Figure 1:
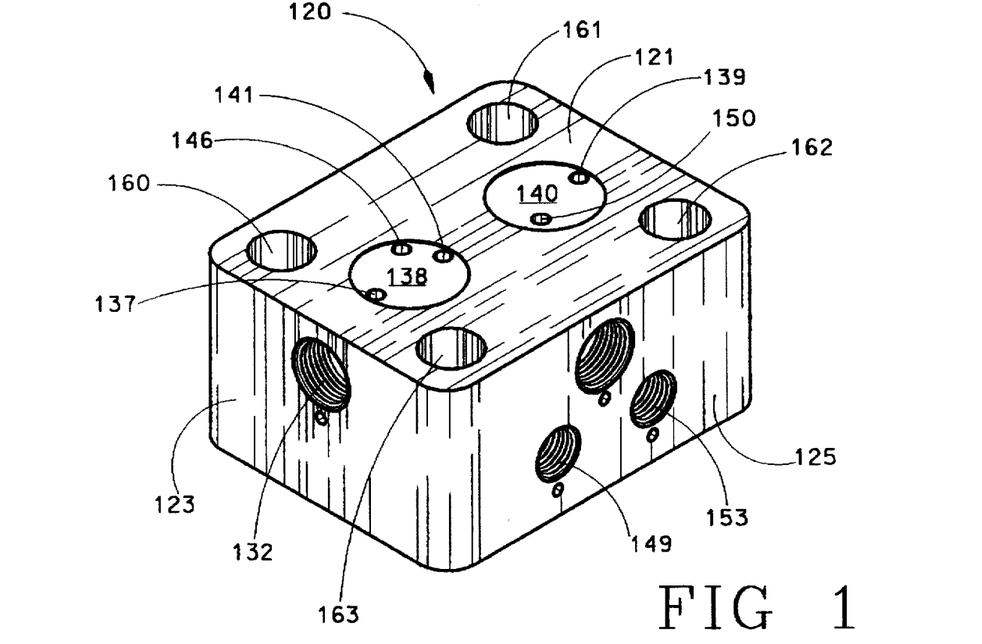
FIG. 1 a top and front perspective view showing a first embodiment of the manifold block including the invention.
Figure 2:
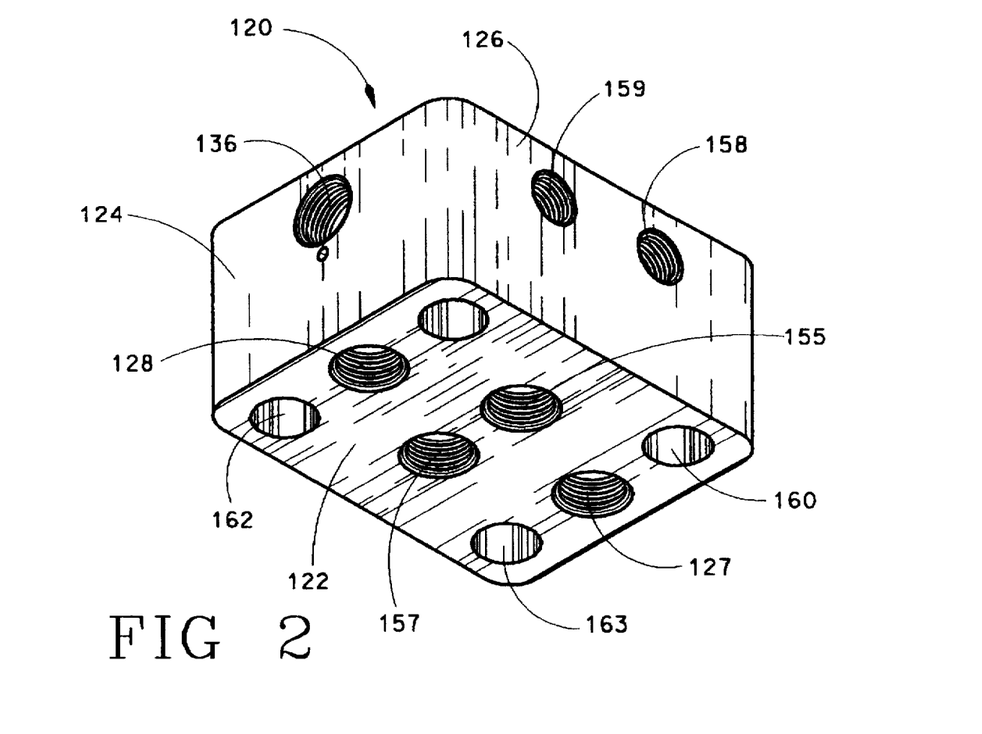
FIG. 2 a bottom and rear perspective view of the manifold block of FIG. 1.
Figure 3:
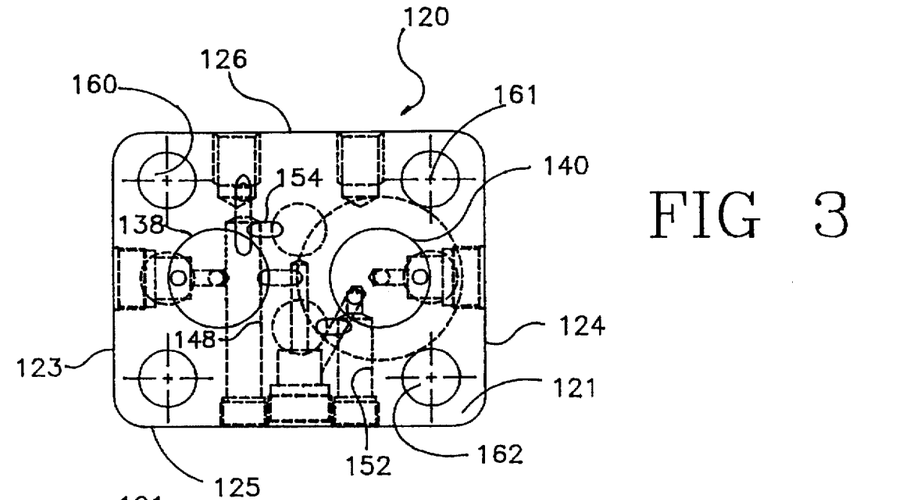
FIG. 3 a top view of the manifold according to FIG. 1.
Figure 5:
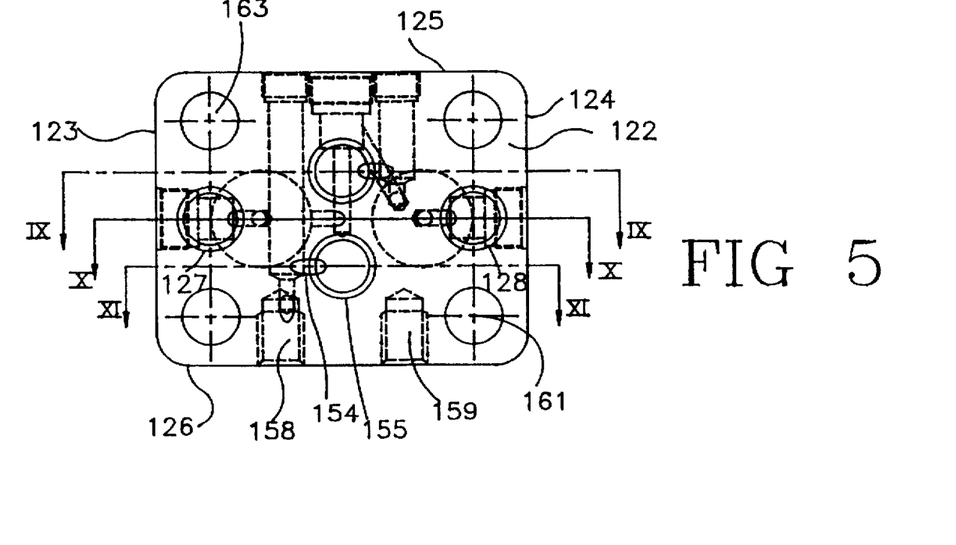
FIG. 5 a bottom view thereof.
Figure 6:
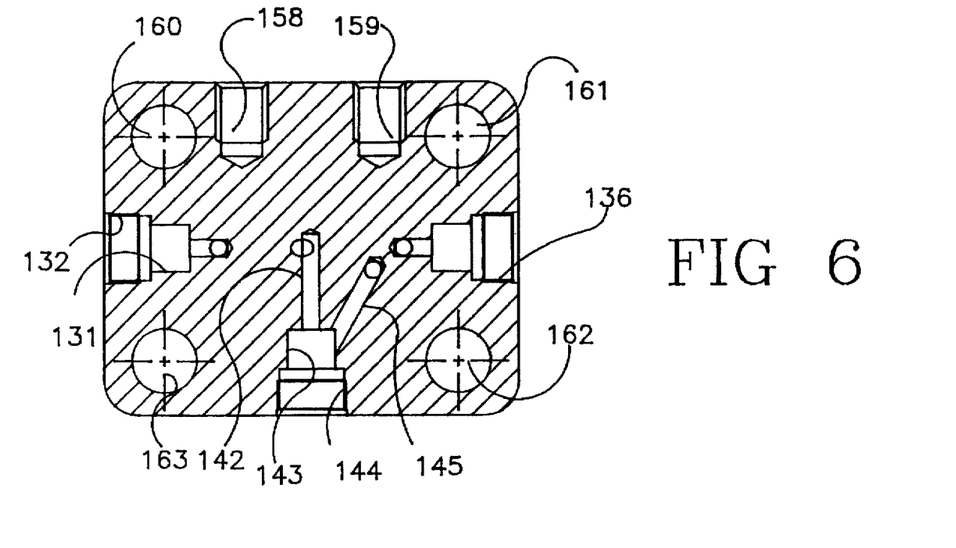
FIG. 6 section VI—VI of FIG. 4.

One of the features of the present invention is seen from FIGS. 3, 5 and 6. In particular, apart from the relatively small thickness as measured between the upper and lower faces 121, 122, those figures show that there are four mounting holes 160–163 disposed about the periphery of the block 120. The axes of the holes 160–163 are perpendicular to the first face section 121. Also, it can be appreciated that the axes of the holes 160–163 coincide with sides of a reference prism. In the embodiment shown, the reference prism is a four-sided prism where the axes actually define each a joinder or corner between two adjacent sides. The number of the mounting holes is optional and is usually given by the disposition of mounting holes on a flange of a pressure transmitter or the like instrument to be used with the block 120. However, even if the number of the mounting holes is more than as shown, the arrangement is such that at least some of the axes of the mounting holes define corners of the reference prism.

Both embodiments of the block described show a block for a five valve manifold. There are provisions made for mounting two block valves, one equalizer valve and two vent valves. Those skilled in the art will readily appreciate, however, that the features of the present invention can be applied in a three valve embodiment which typically has only two block valves and an equalizer valve.

It is true that the advantages of the compactness of the design of the block of the present invention are best appreciated in a five valve manifold. Yet, it can be said that there are "at least three" valve mounting openings, namely the threaded bores 132 and 136 for two block valves for selectively blocking the passage of the process fluid and one equalizing valve mounting bore 144. Note that the inner end of the valve chambers associated with the mounting bores mentioned, namely valve chambers 131, 135 and the equalizer valve chamber 143 are all disposed with their inner ends (where the respective valve seats are located) located inside the imaginary prismatic surface. Of course, in a five valve manifold, the remaining two valve chambers 148, 152 meet the same criteria as the "at least three" chambers 131,135, 143 with respect to their location relative to the mounting bores 160–163.

The drawings further show that the same compact size can be achieved, according to the invention, for a five valve manifold, where at least one, and preferably two, valve chambers 148, 152 and mounting bores are of a reduced diameter compared with chambers 131, 135, 143 but are relatively long to accommodate the type of a valve, where the valve seal is located on the valve stem and engages not the bonnet of the valve, but the interior of the valve chamber itself. This allows the use of an axially reduced length of the bonnet which, combined with a hexagonal head at the outer end of the valve stem, provides space saving feature whereby two valves can be located one to each side of another valve, in the exemplary embodiment, to each side of an equalizer valve. It is preferred that the valves in which the seal is inside the valve chamber and the stem has a hexagonal head for engagement by a wrench or the like, be vent valves. The hexagonal heads provide an additional safety feature as with the distinct appearance they virtually eliminate the possibility of inadvertent opening of the two valves instead of one of the remaining three valves.

Yet another feature seen from the drawings of the first embodiment is in that there is provided a five valve compact manifold wherein both the process fluid inlet and the vent outlet or outlets are arranged in the same face 122 of the body. This provides further reduction of the space required in comparison with existing five valve manifold, where the vent outlets usually have to be directed sideways and thus require additional space at the side of an installed manifold, for connection to vent pipes.

Despite the extremely small overall area of the face 122 of the block, there is sufficient spacing provided between the process fluid inlets and the vent outlets to allow the use of standard couplings for sealed connection. This is due to the fact that the use of one long and one short valve chamber 148, 152 disposed to both sides of but at a different level from the equalizer valve, permit the connection by short, easily machined passageways 154, 156 to vent outlet ports placed on an axis generally central to the block and perpendicular to the axis on which the process fluid inlet ports 127, 128 are located.

Another noteworthy feature of the manifold block shown in FIGS. 1–11 but also in FIGS. 12 to 20 is in that all passageways are comprised of straight passageway sections. These sections are all straight and are either perpendicular to the faces of the block or, if they are inclined, they are still parallel with at least one of the planar outer walls of the block. An example of such inclined passageway section is the oblique conduit 145 which is at an acute angle to the axis of the equalizer valve chamber 143 but is parallel with the top face 121. This is contrary to known multiple-valve manifolds where the valves are disposed on at least two distinct planes parallel with the top face, where a number of so called compound angle passages (i.e. passages which are obliquely inclined with respect to any of the six basic surface walls 121–126). The machining of compound angle passages presents a complex and thus expensive and time consuming task in producing the block. Their elimination is mainly facilitated by the use of the vent valve chambers 148, 152 (and also 248, 253) having a specifically designed length which depends upon the location of the vent valve ports 155, 157 relative to the process inlet ports 127, 128 (and also 255 and 255 vis-a-vis 227, 228 as described hereafter with reference to FIGS. 12, 13. The same applies to all other oblique or inclined passageway sections, for instance 129, 133, 146, 154, 156 and their counterparts 229, 235, 244 of the second embodiment which will now be described in greater detail.

Reference may now be had to FIGS. 12–20 which show the second embodiment of the manifold block according to the invention. In many respects, the second embodiment includes features similar to those described with reference to FIGS. 1–11, as witnessed, for instance, by the comments in the preceding paragraph.

As in the first embodiment, there is provided a solid, preferably, but not exclusively, stainless steel rectangular prism shaped block 220. As in the preceding embodiments, the block has top and bottom wall 221, 222, a first side wall 223, a second side wall 224 a front wall 225 and a rear wall 226.

Figure 16:
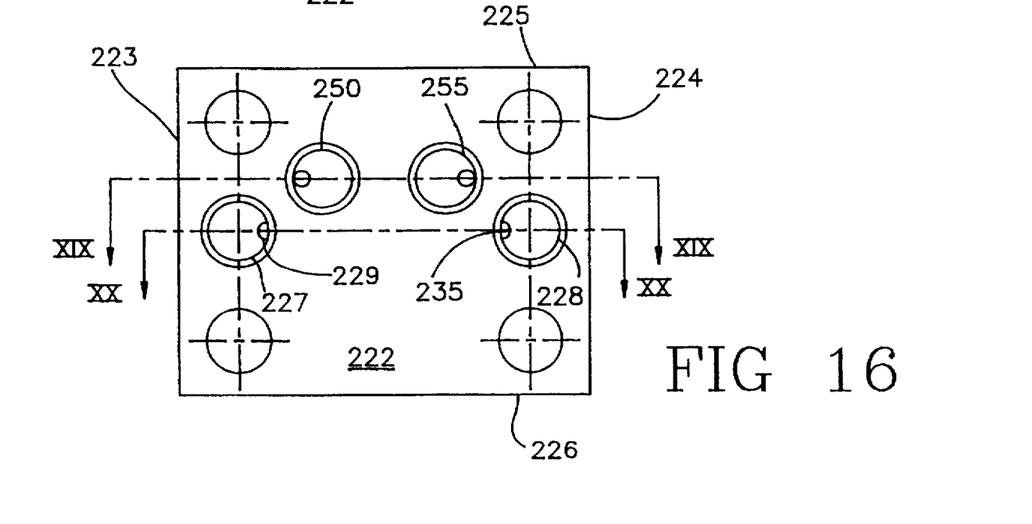
FIG. 16 a bottom plan view thereof

FIG. 16, shows first and second inlet ports 227, 228 machined in the bottom wall 222, for the process fluid. The inlet 227 communicates, via an upwardly and inwardly inclined first passage 229 with an extension 230 of a first block valve chamber 231 co-axial with a threaded first block valve bore 232. The valve chamber 231, in turn, communicates via a short connecting conduit 233 with a first instrument cavity 234. The second inlet 228 communicates in the same fashion, via second passage 235, extension 236 and valve chamber 237, coaxial with threaded bore 238 of the second block valve, and then via a short, vertical connecting conduit 239 with the second instrument cavity 240.

Figure 17:
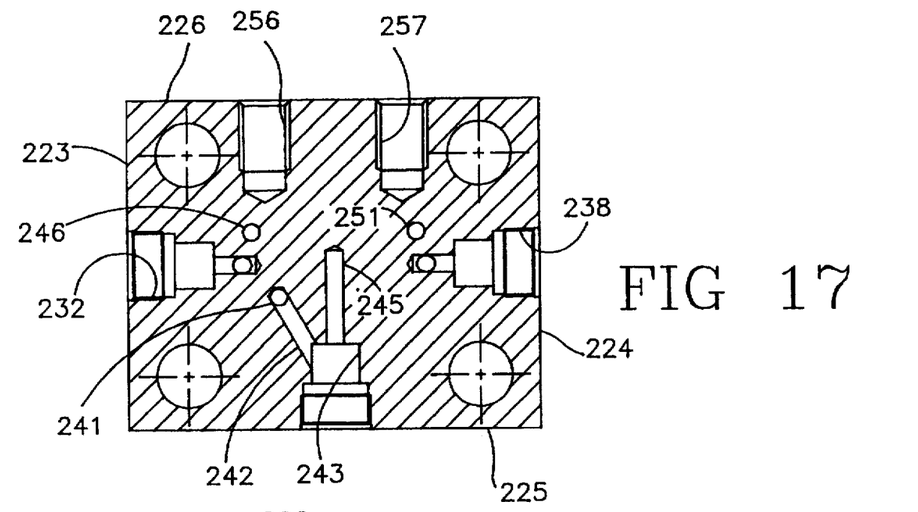
FIG. 17 section XVII—XVII of FIG. 15

The first instrument cavity 234 further communicates via a first short, vertical equalizer channel 241 with a horizontal-oblique channel 242 (FIG. 17) the discharge end of which connects with an equalizer valve chamber 243. Similarly, the second instrument cavity 240 communicates via a downwardly and inwardly sloping channel 244 the outlet of which merges with an inward end of an equalizer valve extension channel 245 (FIGS. 17, 20) coaxial with the equalizer valve chamber 243.

Figure 14:
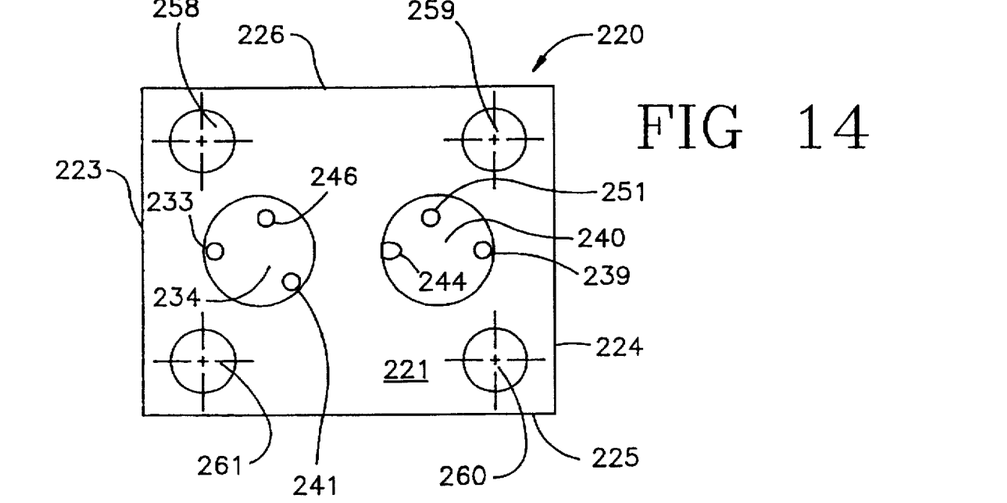
FIG. 14 a top plan view of the manifold shown in FIG. 12.
Figure 15:
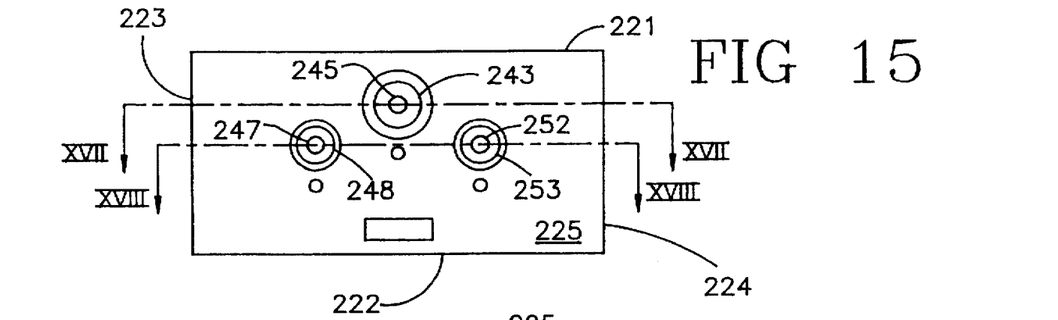
FIG. 15 a front view thereof.
Figure 18:
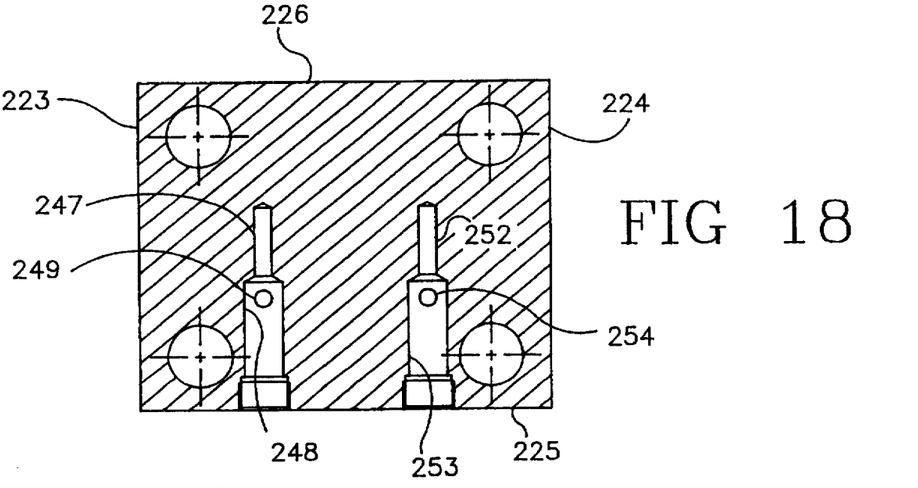
FIG. 18 section XVIII—XVIII of FIG. 15
Figure 19:
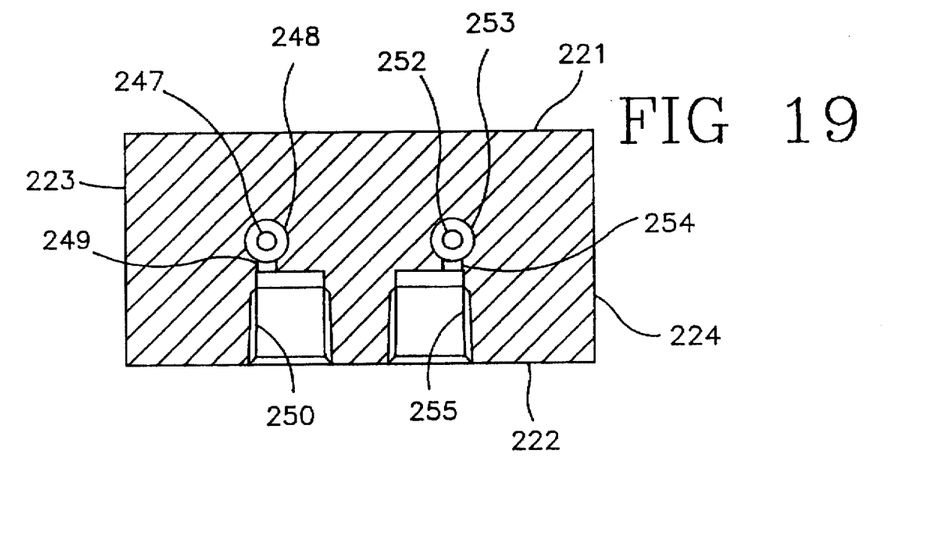
FIG. 19 section XIX—XIX of FIG. 16
Figure 20:
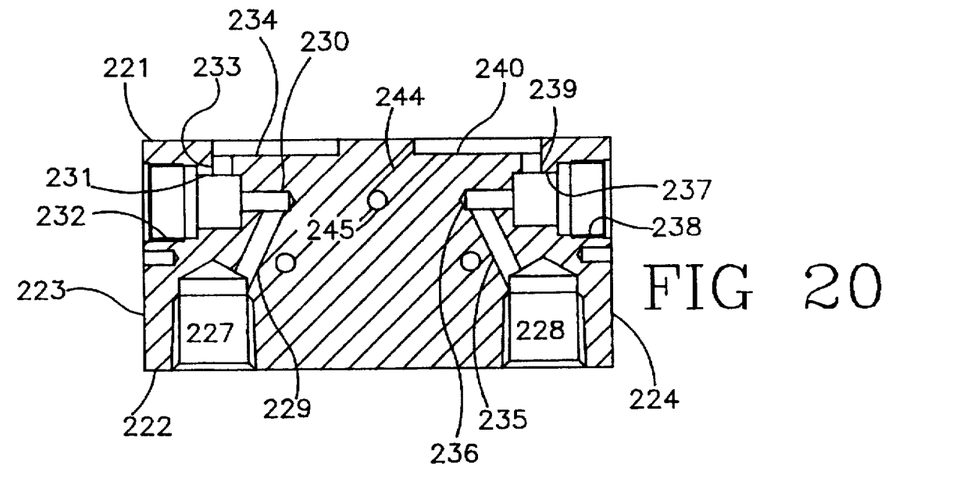
FIG. 20 section XX—XX of FIG. 16
Figure 21:
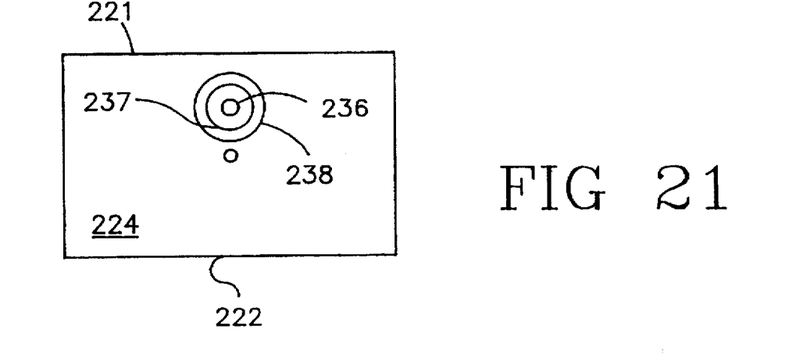
FIG. 21 (on the sheet of FIG. 17) the right hand side view of the representation of FIG. 15, the left hand side view thereof being identical.

Each of the circular cavities 234, 240 is connected to the respective vent conduit. The cavity 234 connects via a vertical conduit 246 (FIG. 14) with a horizontal extension line 247 (FIGS. 18, 19) coaxial and in communication with a first vent valve chamber 248 which, in turn, connects through a short vertical line 249 with a threaded vent discharge port 250. In an identical fashion, the cavity 240 connects via a conduit 251 (FIGS. 14, 17), a horizontal extension 252 coaxial with second vent valve chamber 253, the chamber 253 and a short vertical line 254 (FIGS. 18, 19) with a threaded vent port 255. Note that the length of the vent valve chambers 248, 253 is the same, but is greater than that of any of the remaining valve chambers 232, 237 and 243. This is to facilitate the orientation of the passageway sections 249, 254 which can be machined perpendicular to the second face 222 and straight into the vent discharge ports 250, 255 (FIG. 19).

As in the preceding embodiments, the threaded bores 256, 257 (FIG. 17) serve the purpose of securing the block 220 to a suitable support bracket or the like (not shown) and the four mounting holes 258–261 serve the purpose of accommodating bolts which hold a pressure transmitter in sealing engagement with the top surface 221 and thus with the cavities 234, 240.

Note that in the second embodiment the valve chambers 248, 253 of the vent valve mounting bores are of an even length. This feature accommodates the second preferred embodiment where the pairs of process fluid inlet ports 227, 228 and of the vent outlets 250, 255 are each on a separate reference line parallel with the other reference line, as opposed to the crossing arrangement of the reference lines in the first embodiment.

Figure 4:
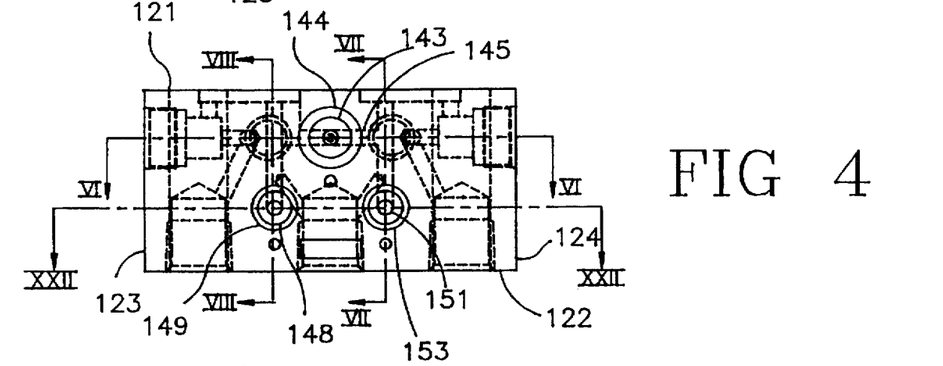
FIG. 4 a front view thereof.
Figure 22:
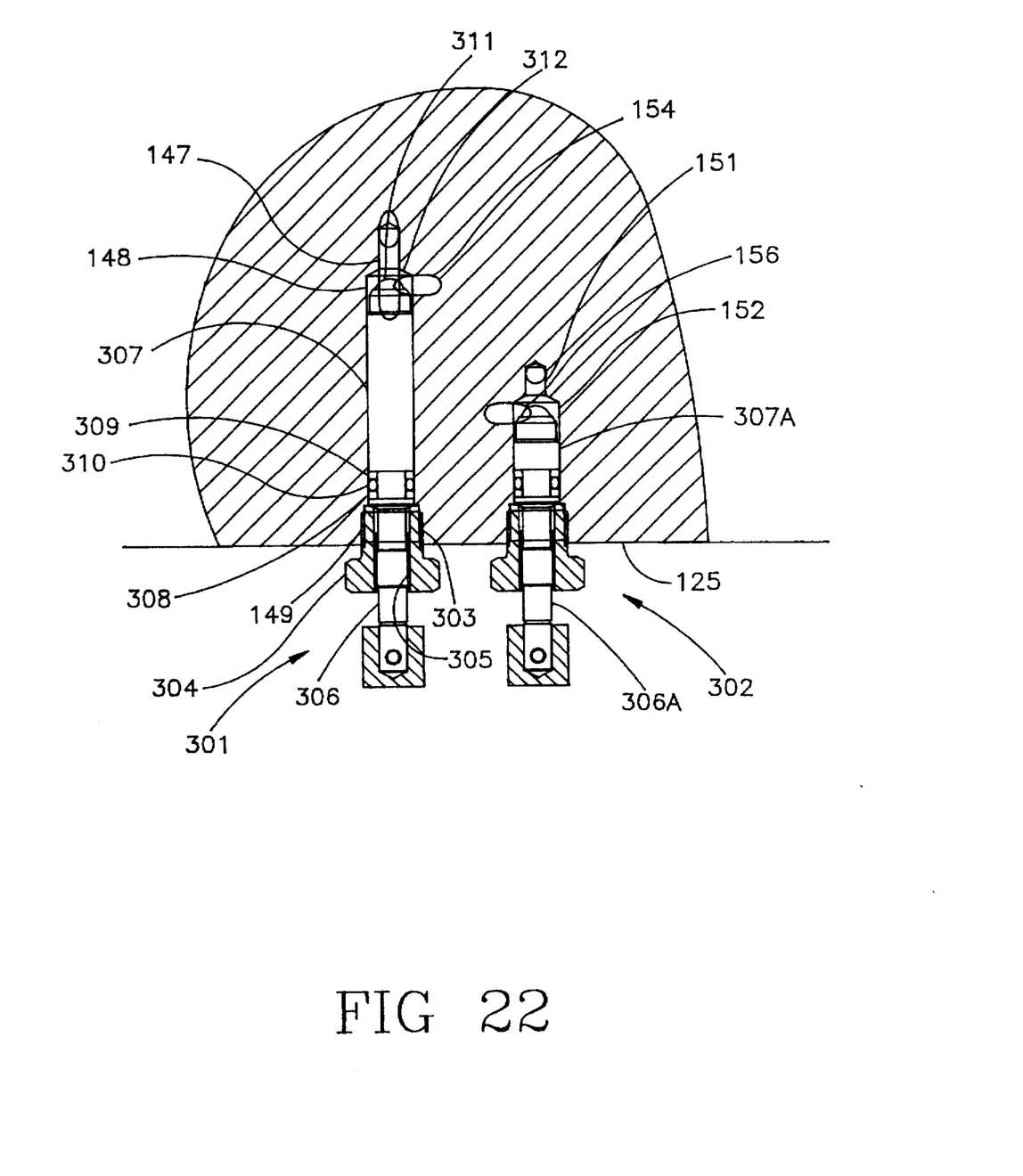
FIG. 22 an enlarged partial view on section line XXII—XXII of FIG. 4 but showing vent valves installed in the block.

Referring now to FIG. 22, as mentioned above, the enlarged representation generally corresponds to a partial of on view on line XXII—XXII of FIG. 4. Referring to the structure of the block itself, there is shown a pair of vent valves 301, 302 installed in the first embodiment of the manifold block of the invention.

The long vent valve chamber 148, and the associated coaxial threaded bore 149 and the transverse conduit 154 and the extension conduit 147 are as shown in FIG. 5. Threaded in the thread of the first vent valve bore 149 is a bonnet 303 having a wrench compatible outer hexagonal portion 304. The bonnet 303 has a coaxial threaded bore 305 which is threadably engaged by a threaded portion of a vent valve stem 306. The inner part of the stem 306, marked with reference number 307, is freely movable within the valve chamber 148. It is provided, at a point near the bonnet 303, with a seal mounting groove within which is disposed a pair of backup rings 308, 309 from Teflon and with an intermediately positioned sealing 0-ring 310 made from a suitable elastomeric material.

The end of the stem 307 carries a hemispherical tip 311 compatible with a valve seat 311. Thus, the tip 310 co-operates with the valve seat 311 to selectively block or open the passage of fluid from extension conduit 147 to the transverse conduit 154 and from there to the first vent outlet 155.

The opposite, outer end of the stem 307 has fixedly secured to it a hexagonal head compatible with a suitable wrench. Accordingly the vent valve can only be open or closed by using a suitable tool.

The valve mounted in the second vent valve mounting bore comprised (FIG. 7) of the threaded second vent valve bore 153 and the coaxial second vent valve chamber 152 communicating with the short extension conduit 151 and with the transverse conduit 156 (FIG. 11) which terminates at the second vent outlet 157.

The overall arrangement of the second vent valve 302 is the same as that of the first vent valve described above except for the length of the inner part 307a of the valve stem 306a. Therefore, the parts of the second vent valve 302 and the associated second valve mounting bore are not described in detail.

FIG. 22 shows the valves 301,302 in an open state. Using a suitable wrench, the stem 306 can be turned to cause, an axial displacement of the stem 306 toward the seat 312 until the tip 311 sealingly engages the seat 312 to interrupt the flow of the fluid from extension line 147 to the transverse conduit 154.

The operation of the manifolds described is a typical operation of a five-valve manifold which is known per se and therefore does not have to be described. It will suffice to briefly mention that under normal circumstances, when a pressure differential is to be sensed at the pressure transmitter or the like pressure processing apparatus, blocking valves mounted in the mounting bores 132, 136 or 232, 238 are open allowing communication between the process inlet ports and the cavities. If absolute pressure is to be sensed, one of the block valves is closed. If pressure is to be made equal at both sides of a diaphragm of the sensing apparatus, the equalization valve is open. And the vent valves are open whenever one or both cavities at the instrument are to be relieved of pressure.

Figure 23:
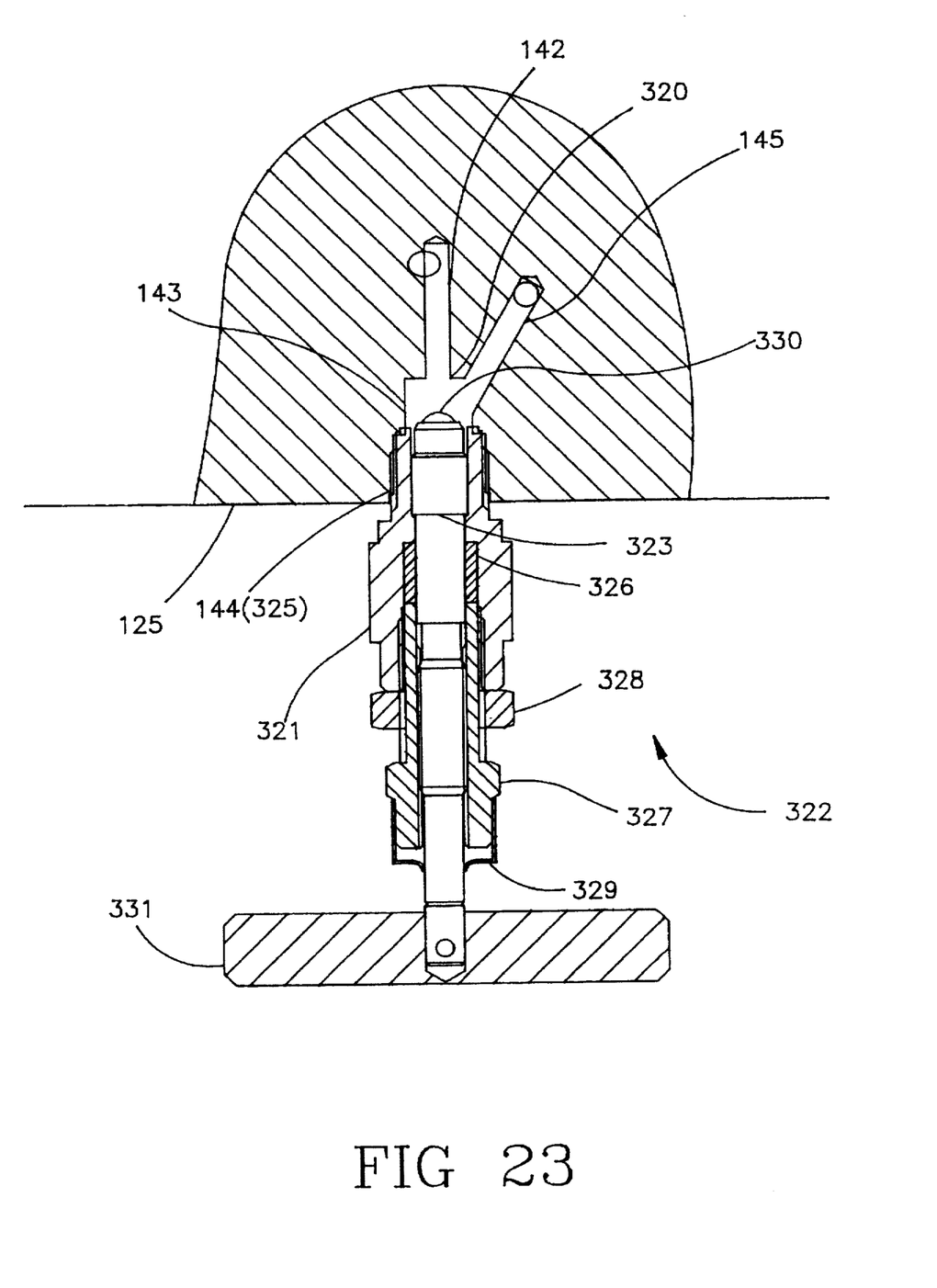
FIG. 23 an enlarged partial view on section line VI—VI of FIG. 4 but showing an equalizer valve installed in the block.

Reference should now be had to the arrangement shown in FIG. 23. While the drawings of the present specification are not to scale, an effort has been made to show the true relative size of the components shown in FIG. 23.

The manifold block is the same as that of FIG. 23, as indicated by reference number 125 designating the front wall of the block. As described, the equalizer valve mounting bore comprises the valve chamber 143 (FIG. 6) and a threaded bore 144 at the front wall 125. The valve chamber 143 communicates, via an opening at the valve seat 320 with the extension conduit 142 and, via an opening in the side wall of the valve chamber 143 with the oblique conduit 145.

The threaded bore 144 threadably receives a bonnet 321 of an equalizer valve referred to with reference number 322. The equalizer valve 322 and thus the equalizer valve mounting bore 144, 143 are of the type typically used in valve manifold of this type. That is to say, the valve 322 is of the type wherein a valve stem 323 is threadably received in the bonnet 321. The bonnet has an outer thread 325 mounted in the threaded bore 144, as is well known in the art.

The bonnet defines a packing chamber which receives a packing 326 held in place and compressed by a packing gland 327 threaded in the outer end of the packing chamber and locked in its position by a locking nut 328. The inside and axially outer portion of the gland 327 is threaded by a thread compatible with that on the outside of the stem 323. A dust cap 329 protects the threaded connection between the stem 323 and the gland 327. The inner end of the stem 323 is provided with a hemispherical closing member 330 compatible with the seat 320 so that the operation of the valve 322 by the handle 331 results in selective closing or opening of the fluid flow from the extension conduit 142, through the valve chamber 143 and into the oblique conduit.

The valve 322 is one of many commercially available valves of the type with the packing inside the bonnet. it can be readily appreciated that the valve 322 requires substantially more space at the exterior of the manifold (i.e. at the vicinity of the front wall 125) both as to the overall maximum length as a distance from the wall 125, and as regards the overall diameter. The vent valve 301 or 302, on the other hand, requires a much shorter outer length and a smaller diameter, not to mention that the selectively designed length of the valve chamber 148 or 152 can be utilized in simplifying the structure of the conduits of the manifold by bringing the respective valve seat and the outlet port to a position where the connecting conduits do not require to be at a complex angle of a double oblique inclination relative to the surface of the block.

Those skilled in the art will appreciate that further embodiments exist which differ from those described, without departing from the scope of the present invention as set forth in the accompanying claims. For instance, as one of many variants, while the five valve arrangement is preferred, it is not beyond the scope of the present invention to provide an arrangement where only one vent valve mounting hole (and thus only one vent valve) would be provided. Another readily conceivable variant is that where, in some installations, the structure of the vent valve utilized in the preferred embodiments, could be utilized for another type of valve or valves.

I therefore wish to protect by letters patent which may issue on the present application all such embodiments as fairly fall within the scope of my contribution to the art.

I claim:

1. A valve manifold for use with a pressure sensing apparatus, comprising, in combination:
   (a) an integral body including a first face section, a second face section generally parallel with the first face section and a peripheral section extending between the first and second face sections;
   (b) a process fluid inlet port means in said second face section and a process fluid outlet port means in said first face section, said process fluid outlet port means being complementary with inlet ports of an associated pressure sensing apparatus;
   (c) a plurality of apparatus mounting holes provided in said first face section and disposed about the periphery of the first face section, for receiving bolts operatively securing the pressure sensing apparatus to said first face section;
   (d) said apparatus mounting holes having axes generally perpendicular to said first face section, said axes defining sides of a reference prism having ends coplanar with said first and second face sections, at least some of said axes being coincident with corners of said reference prism;
   (e) a plurality of valve mounting bores, each bore extending from a point on said peripheral section inwards of the body;
   (f) each valve mounting bore including a threaded outer end portion at said peripheral section and a coaxial, generally cylindrical valve chamber defining an inner end portion of the bore,
   (g) said inner end portion including a valve seat coincident with an outlet of an upstream section of a respective passageway into the respective valve chamber;
   (h) said valve chamber further communicating through a port provided in a side wall thereof, with a downstream section of the respective passageway;
   wherein
   (i) the valve seat of each of said valve chambers is located within a space delimited by said reference prism.

2. The manifold of claim 1, wherein the periphery of the body is multilateral and wherein the instrument mounting holes are generally at corners of the periphery of the body.

3. The manifold of claim 1, including five said valve mounting bores and further comprising vent outlet port means disposed in said second face section.

4. The manifold of claim 3, wherein the process fluid inlet port means is a pair of inlet ports having centres disposed on a first reference line coincident with said second face section, and the vent outlet port means is a pair of outlet ports the centers of which are disposed on a second reference line coincident with said second face section and intersecting the first reference line at generally right angles, the point of intersection of the reference lines being disposed generally centrally of said second face section.

5. The manifold of claim 3, wherein the process fluid inlet port means is a pair of inlet ports having centers disposed on a first reference line coincident with said second face section, and the vent outlet port means is a pair of outlet ports having centers disposed on a second reference line coincident with said second face section and generally parallel with the first reference line.

6. The manifold of claim 2, in which the peripheral section includes a plurality of generally planar wall portions disposed at an angle to one another, one of said wall portions comprising a pair of said valve mounting bores generally parallel with and spaced from each other, said pair of said mounting bores:
   (a) being equidistantly spaced from said first face section, having each generally the same length of said threaded outer end portion but having cylindric valve chambers of uneven lengths, the axes of said pair of the valve mounting bores being generally parallel with said first face section;
   (b) the communication port of each valve chamber of said pair of the valve mounting bores being disposed near an associated valve seat and being remote from the associated threaded outer end portion;
   (c) each valve chamber being compatible with a valve assembly including a valve stem threaded in a bonnet compatible with said threaded outer end portion and having a valve closing member at a free end of the stem, for engagement with the respective valve seat, the valve stem further including a seal for sealing engagement with the respective cylindric valve chamber, said seal being disposed at a location of the stem axially spaced both from the closing member and from the bonnet, whereby the bonnet can be devoid of a sealing engagement and thus of a reduced overall diameter.

7. The manifold of claim 6, wherein each valve mounting bore of said pair is provided with a valve assembly including a valve stem threaded in a bonnet compatible with the threaded outer portion and having a valve closing member at a free end of the stem, for engagement with the respective valve seat, and a seal for sealing engagement with the respective cylindric valve chamber, said seal being disposed at a location of the stem between the closing member and the bonnet, the bonnet being devoid of a sealing engagement with the stem and thus being of a reduced overall diameter.

8. The manifold of claim 7, wherein an outer end of the stem of said valve assembly remote from the valve closing member is shaped for engagement with a complementary torque transmitting tool.

9. The manifold of claim 8, wherein said outer end of the stem is of a hexagonal configuration.

10. The manifold of claim 6, wherein a third valve mounting bore is provided in said one of said side walls, said third valve mounting bore:
(a) being generally parallel with said pair of said valve mounting holes;
(b) being disposed between said pair of said mounting holes and at a closer spacing from one of said face sections;
(c) having its threaded outer end portion and its valve chamber of diameters larger than those of said pair of said valve mounting holes;
(d) having the valve seat closer to said one of the side walls than the distance from said one of the side walls from the valve seat of any of said pair of valve mounting bores;
(e) being compatible with a valve assembly including a bonnet with a seal secured to a stem of the third valve, said seal being disposed within the bonnet, and sealingly engagement the bonnet.

11. The manifold of claim 10, wherein said pair of valve mounting bores are vent valve mounting bores and said third valve mounting bore is an equalizer valve mounting bore.

12. The manifold of claim 11, wherein a block valve mounting bore is provided in each of two further generally planar side walls of the body, said further side walls being two opposed side walls and being each at an angle to said one of said side walls, and said block valve mounting bores being of generally the same size as that of said third valve mounting bore.

13. A valve manifold for use with a pressure sensing apparatus, comprising, in combination:
(a) an integral body including a first face section, a second face section generally parallel with the first face section, and a peripheral section extending between the first and second face sections;
(b) a process fluid inlet port means in said second face section, and a process fluid outlet port means in said first face section, said outlet port means being complementary with inlet ports of an associated pressure sensing apparatus;
(c) vent outlet port means disposed at said second face section;
(d) a plurality of peripheral apparatus mounting holes provided about the periphery of the first face section, compatible with bolts for operatively securing the associated pressure sensing apparatus to the body at said first face section thereof, the axes of said apparatus mounting holes being generally perpendicular to said first face;
(e) a plurality of valve mounting bores each said bore being machined in said peripheral section and having an axis directed inwardly of the body for selectively manipulating passage of fluid through passageways provided in said body.

14. The manifold of claim 13, wherein the peripheral section comprises a plurality of generally planar side walls disposed at an angle relative to one another, one of said walls being provided with a pair of vent valve mounting bores generally parallel with and spaced from each other, said vent valve mounting bores:
(a) being equidistantly spaced from said first face section;
(b) having each generally the same length of said threaded outer end portion but having cylindric vent valve chambers of uneven lengths, the axes of the vent valve mounting holes of said pair of vent mounting holes being generally parallel with said first face section;
(c) each vent valve chamber including a communication port disposed in a side wall of the vent valve chamber, the communication port being disposed near a vent valve seat at an inner end of the vent valve chamber and being remote from the associated threaded outer end portion;
(d) each vent valve chamber being located in conduit means extending between the process fluid outlet port means and the vent fluid outlet port means.

15. The manifold of claim 14, wherein each of said pair of said vent valve mounting bores is provided with a vent valve assembly including a vent valve stem threaded in a bonnet compatible with the threaded outer portion and having a vent valve closing member at an inner end of the vent valve stem, for engagement with the respective vent valve seat, and a seal mounted on said stem and sealingly engaging the cylindric vent valve chamber, said seal being disposed at a location of the vent valve stem axially between the vent valve closing member and the vent valve bonnet, the vent valve bonnet being devoid of a sealing engagement with the vent valve stem and thus being of a reduced overall diameter.

16. The manifold of claim 15, wherein an outer end of the vent valve stem remote from the vent valve closing member is shaped for engagement with a complementary torque transmitting tool.

17. The manifold of claim 16, wherein said outer end of the stem is of a hexagonal configuration.

18. The manifold of claim 14, wherein a third valve mounting bore is provided in said one of said wall sections, said third valve mounting bore:
(a) being generally parallel with said pair of said vent valve mounting bores;
(b) being disposed between said pair of said vent valve mounting bores and at a different spacing from the first or second face section than that of said vent valve mounting bores;
(c) having a threaded outer end portion and a valve chamber of diameters larger than those of said pair of said vent valve mounting bores;
(d) having the valve seat of its valve chamber closer to said one of the side walls than the distance from said one of the side walls to the valve seat of any one of said pair of vent valve mounting holes, whereby the valve seats of said vent valve mounting bores and of said third valve mounting bore are disposed each at a distinct distance from said one of the side walls;
(e) being compatible with a valve assembly which includes a bonnet which is provided to engage a seal between the bonnet and the valve stem of the valve.

19. The manifold of claim 18, wherein said third valve mounting bore is an equalizer valve mounting bore.

20. The manifold of claim 19, wherein a block valve mounting hole is provided one in each of two further generally planar side walls of the body, said further side walls being two opposed side walls and being each at an angle to said one of said side wall sections and said block valve mounting holes and valve chambers being of generally the same size as that of said third valve mounting holes, whereby the manifold is capable of operation of a five-valve manifold.

21. A valve manifold for use with a pressure sensing apparatus, comprising, in combination:

(a) an integral body including a first face section, a second face section generally parallel with the first face section and a peripheral section extending between the first and second face sections;

(b) process fluid inlet port means in said second face section, process fluid outlet port means located in said first face section and being complementary with inlet ports of an associated pressure sensing apparatus, and vent outlet port means in said second face section;

(c) a plurality of apparatus mounting holes provided in said first face section and disposed about the periphery thereof, for receiving bolts operatively securing the pressure sensing apparatus to said first face section;

(d) a plurality of valve mounting bores, each extending from a point on said peripheral section inwards of the body, each valve mounting bore including a threaded outer end portion at said peripheral section and a coaxial, generally cylindrical valve chamber defining an inner portion of the valve mounting bore;

(e) an inner end portion of the valve chamber including a valve seat coincident with an outlet of a first passageway into the respective valve chamber;

(f) said valve chamber further communicating, through a port provided in a side wall thereof, with an inlet of a second passageway;

wherein (i) a first portion of said plurality of the valve mounting bores is compatible with a bonnet sealed valve of the type including a valve stem passing through a bonnet having an outer thread compatible with said threaded outer end portion of the bore and provided with a seal between the bonnet and the valve stem; and (ii) a second portion of said plurality of the valve mounting bores is compatible with a valve chamber sealed valve of the type including a valve stem passing through a bonnet having an outer thread compatible with said threaded outer end portion of the bore and devoid of a seal between the bonnet and the valve chamber, a seal being provided between the valve stem and the valve chamber, said seal being spaced axially inwards of the bonnet but axially outwards of the port provided in the side wall of the valve chamber.

22. The valve manifold of claim 21, wherein said first portion of said plurality of the valve mounting bores includes valve mounting bores for blocking valves for selectively blocking fluid communication between said inlet and outlet port means and said portion of said plurality of the valve mounting bores includes vent valve mounting bores for selectively opening or closing vent discharge ports of the manifold.

23. The valve manifold of claim 21, wherein (i) said first portion of said plurality of the valve mounting bores includes two blocking valve mounting bores each compatible with a blocking valves for selectively blocking fluid communication between said inlet and outlet port means and one equalizer valve mounting bore compatible with an equalizer valve for interconnecting two process fluid passages between the inlet and outlet port means to equalize the pressure at the outlet port means; and (ii) said second portion of said plurality of the valve mounting bores includes vent valve mounting bores for selectively opening or closing vent discharge ports of the manifold.

24. The valve manifold of claim 23, comprising two process fluid inlet ports and two vent discharge ports, all located in said second face section, said peripheral section being comprised of a number of generally planar side walls generally perpendicular to the faces of the manifold, wherein said equalizer valve mounting bore and two said vent valve mounting bores are all provided in one of said planar side walls.

25. The valve manifold of claim 24, wherein the axes of the equalizer valve mounting bore and of the two vent valve mounting bores are parallel with each other and with the faces of said manifold, the axes of the vent valve mounting bores being disposed in a plane parallel with the faces of the manifold and spaced from a plane parallel with said faces and coincident with the axis of the equalizer valve mounting bore.

26. The valve manifold of claim 25, wherein the process fluid inlet port means is a pair of inlet ports having centers disposed on a first reference line coincident with said second face section, and the vent outlet port means is a pair of outlet ports having centers disposed on a second reference line coincident with said second face section and generally parallel with the first reference line, the valve chambers of the vent valve mounting bores being of an even length which is greater than that of the valve chambers of the first portion of said plurality of the valve mounting bores.

27. The valve manifold of claim 25, wherein the process fluid inlet port means is a pair of inlet ports having centers disposed on a first reference line coincident with said second face section, and the vent outlet port means is a pair of outlet ports the centers of which are disposed on a second reference line coincident with said second face section and intersecting the first reference line at generally right angles, the point of intersection of the reference lines being disposed generally centrally of said second face section, and wherein the valve chamber of the vent valve mounting bores are of an uneven length, each vent valve mounting bore being longer than any one of the valve chambers of the first portion of said plurality of the valve mounting bores.

28. The manifold of claim 22 wherein an outer end of the vent valve stem remote from the vent valve closing member is shaped for engagement with a wrench or the like tool.

29. A valve manifold for use with a pressure sensing apparatus, comprising, in combination:

(a) an integral body including a first generally planar face section, a second generally planar face section generally parallel with the first face section, and a peripheral section extending between the first and second face sections and including two opposed, planar, outer side walls perpendicular to the face sections, a planar front wall and an opposed, planar rear wall, said front and rear walls being perpendicular to the face sections and to the side walls;

(b) a process fluid inlet port means in said second face section and a process fluid outlet port means in said first face section, said process fluid outlet port means being complementary with inlet ports of an associated pressure sensing apparatus;

(c) vent outlet port means in said second face;

(d) a plurality of apparatus mounting holes provided in said first face section and disposed at a close spacing from the periphery of the first face section, for receiving bolts operatively securing the pressure sensing apparatus to said first face section said apparatus mounting holes having axes generally perpendicular to said first face section;

(e) five valve mounting bores, each extending from a point on said peripheral section inwards of the body and each including a threaded outer end portion at said peripheral section and a coaxial, generally cylindrical valve chamber defining an inner portion of the bore, (f) said valve chamber being provided, at an inner end portion thereof, with a valve seat coincident with an outlet of an upstream section of a respective passageway into the respective valve chamber;

(g) a side wall of said valve chamber being provided with an outlet port coincident with a downstream section of a respective passageway leading out of the respective valve chamber;

(h) said passageways being formed by a plurality of straight passageway sections communicating with one another, with said port means and with said valve chambers;

(i) said passageway sections being so disposed and arranged that each passageway section is parallel with at least said faces or said side walls or said front and rear walls, whereby the machining of said passage sections is facilitated.

30. The valve manifold as claimed in claim 29, wherein the periphery of said faces is rectangular, said axes of the instrument mounting holes being disposed at the corners of the rectangular periphery, the valve seat of each of said valve chambers being located within a space delimited by said axes of the mounting holes.

31. The valve manifold as claimed in claim 29, wherein said five valve mounting bores are comprised of (i) two valve mounting bores, one in each of said side walls; and (ii) three valve mounting bores, all provided in one of said front or rear walls, each valve mounting bore extending from a point on the respective wall inwards of the body.

32. The valve manifold of claim 31, wherein (a) the axes of said two valve mounting bores and of one of said three valve mounting bores are disposed on a first reference plane parallel with said face sections;

(b) the axes of the remaining two of said three valve mounting bores are disposed on a second reference plane parallel with said first face and more remote therefrom than said first reference plane, one to each side of the axis of the first of said three valve mounting bores.

33. The valve manifold of claim 32, wherein said two of said three valve mounting bores are vent valve mounting bores.

34. The manifold of claim 33, wherein each said vent valve mounting bore is provided with a vent valve assembly including a vent valve stem threaded in a vent valve bonnet compatible with the threaded outer end portion of the respective one of vent valve mounting bores, and having a vent valve closing member at a free end of the stem, for engagement with a vent valve seat of the respective vent valve chamber, and a seal for sealing engagement with the vent valve chamber, said seal being disposed at a location of the stem axially between the vent valve closing member and the vent valve bonnet, the vent valve bonnet being devoid of a sealing engagement with the stem and thus being of a reduced overall diameter.

35. The manifold of claim 34, wherein an outer end of the vent valve stem of said vent valve assembly remote from the valve closing member is shaped for engagement with a complementary wrench or the like torque inducing tool.

* * * * *